April 30, 1963 F. SENDER 3,088,067

CONTROL CIRCUIT ARRANGEMENT, PARTICULARLY FOR LOW-OHMIC AMPLIFIERS

Filed Nov. 16, 1959 2 Sheets-Sheet 1

INVENTOR
Fr. SENDER

By: Stevens, Davis, Miller & Mosher
Attorneys

INVENTOR
Friedhelm Sender
BY
Stevens, Davis, Miller & Mosher
ATTORNEYS 3,088,067

CONTROL CIRCUIT ARRANGEMENT, PARTICULARLY FOR LOW-OHMIC AMPLIFIERS

Friedhelm Sender, Hannover, Germany, assignor to Prakla Gesellschaft für praktische Lagerstättenforschung G.m.b.H., Hannover, Germany Filed Nov. 16, 1959, Ser. No. 853,338
Claims priority, application Germany Nov. 18, 1958
6 Claims. (Cl. 323—22)

The present invention relates to a control circuit arrangement, particularly for low-ohmic amplifiers, operating on the principle of voltage divider regulation.

For the control of amplifiers to be used mainly for seismological measuring technique frequently a diode control system is used which is based on the following principle: the input voltage to be regulated is applied to a voltage divider which is composed of a fixed ohmic resistor and an electronically variable resistor from which the output voltage is derived. As a controllable resistor for example a diode is used, the bias voltage of which is determined directly or indirectly by the output voltage. By varying the bias voltage the working point on the diode characteristic is varied, which is strongly curved mainly adjacent the voltage null point so that the dynamic internal resistance of the diode undergoes a strong variation. Thereby the voltage divider is varied whereby the regulating effect is achieved.

Since any non-linear member in the circuit to be controlled may lead to distortions, the variable resistor of the diode voltage divider is mostly composed of two diodes, which are connected anti-parallel with one another, and which by mutually supplementing their characteristics abolish the non-linear distortions or at least keep them very small. By suitable compensation provision is made that the characteristics of the pairs of diodes match one another well, lest an additional direct current component be superimposed to the voltage to be regulated which would lead to difficulties in the further amplification and visible display of the voltages (on oscillographs).

With high-ohmic circuits as hitherto usual in the electronic valve technique the regulation can be kept under control by means of special circuits. However when changing over to low-ohmic circuits as required by the transistor technique, one is compelled to extend the control far over the diode characteristic, whereby the asymmetry of the diodes makes itself particularly felt, (since two diodes nearly never conform with one another over the whole range of their characteristics up to the highest voltages). Distortions of the voltages made visible are the consequence.

It is the main object of the present invention to overcome these difficulties and to provide a control circuit arrangement mainly for low-ohmic amplifiers wherein the aforesaid distortions of the voltages made visible are obviated. It is another object of the invention to provide a control circuit arrangement of the kind referred to wherein a D.C. offset free control i.e. without superimposed direct current component, is attained. It is yet another object of the invention to provide a control circuit arrangement for low-ohmic amplifiers wherein the control voltage supplied to the emitter-base circuit of transistors used in this circuit arrangement may even assume positive values, and wherein a control voltage high frequency oscillator used in this circuit arrangement oscillates even at null control voltage and generates a low positive bias voltage, which at increasing control voltages is overridden by a higher negative control voltage.

It is a further object of the invention to provide a control circuit arrangement of the kind referred to wherein the reaction of the control on the circuit to be controlled is reduced to a lower order of magnitude. It is still a further object of the invention to provide a control circuit arrangement of the kind referred to wherein the characteristics of the diodes and/or transistors used in this arrangement can be made to practically conform with one another.

With these and other objects in view which will become apparent later from this specification and the accompanying circuit diagram, I provide a control circuit arrangement for amplifiers operating on the principle of voltage divider regulations, comprising in combination: a fixed resistor, at least one transistor having a collector-emitter circuit forming a variable resistor connected in series with the said fixed resistor and having a base, the input voltage to be regulated being applied across the said two resistors connected in series, and the regulated output voltage being derived across the said variable resistor and being applied to the said base.

In contrast to the known diode circuit arrangements the control voltage is accordingly no longer superimposed on the circuit to be controlled, but is supplied to a control circuit whereby the reaction of the control on the circuit to be controlled is considerably reduced (i.e. with the usual dimensions) by a factor of about 30. Even with a single transistor as the variable resistance one obtains results such as have been attainable hitherto only with selected matched pairs of diodes.

In this transistor circuit arrangement the emitter-collector circuit of a transistor is utilized as a controllable resistance, no additional external source of voltage being required for the operation of the said transistor circuit. Accordingly this kind of control produces a control, free from D.C. offset, i.e. no additional direct current component arises in the controlled voltage. Such a circuit arrangement could not be realized with electronic valves, which would have to be operated at null anode voltage, since for the prevention of space charging effects a low suction voltage would have to be applied to the anode whereby a surge-free control effect would be made impossible.

In a convenient further development of the invention however two transistors are used as variable resistors for the control circuit arrangement, since a single transistor can operate only over comparatively small alternating voltage amplitude ranges owing to the saturation character of its collector current characteristic, so that after exceeding a certain amplitude distortions may not be avoidable.

In one embodiment of the invention the collector-emitter circuits of two complementary symmetrical transistors connected in parallel are used as the variable resistance to the bases of which transistors the controlled voltage is applied. Accordingly two transistors are used, for example one pnp-transistor and one npn-transistor connected in parallel, the characteristics of which mutually compensate one another. The characteristics of both transistors have to be so selected that they correspond to one another to a large extent so that a control effect free from distortions results.

In practice however complementary symmetrical transistors having almost identical characteristics are hardly obtainable. The characteristics of commercial pnp- and npn-transistors differ considerably from one another. It is therefore further proposed according to the invention to use as the variable resistance the collector-emitter circuits of two equal transistors in anti-parallel connection, on the base of each of which the controlled voltage acts separately. The control voltage is then to be selected at such a magnitude and polarity that the control takes place free from distortions. Since in this circuit arrangement one emitter of an emitter-base circuit is at the voltage potential of the voltage to be regulated with respect to "earth," the control voltage is supplied indirectly in that the output voltage is transformed into a voltage of higher frequency, which after transformation and rectification is available as an earth-free direct voltage of any desired polarity and magnitude for use as a control voltage.

Germanium transistors show, as well known, a strong temperature sensitivity, and allow even at null control voltage a collector current to flow which is strongly dependent on temperature. In order to be able to suppress this collector current, it is necessary that the control voltage applied to the emitter-base circuit may even assume positive values. At a null input voltage and/or very low amplitudes the emitter-base circuit must have a small positive bias voltage in order to make the internal resistance of the transistor very high. This is attained in that the rectification of each of the alternating voltages proportional to the output voltage is effected through two rectifiers connected in anti-parallel arrangement, and having different response voltages and internal resistances. Then by suitable dimensioning of the control voltage high frequency oscillator, provision is made that the oscillator oscillates even at a null control voltage and generates a low positive bias voltage by rectification over a suitably polarised high-ohmic diode, e.g. a germanium diode, made even higher ohmic by a resistor in series. Another, preferably low-ohmic diode is connected to this germanium diode in parallel with opposite polarity, for example a silicon diode, which has a higher response voltage than the germanium diode. By means of this silicon diode a negative control voltage is obtained at increasing control voltages i.e. at increasing high frequency amplitudes, which overrides the positive control voltage generated by the germanium diode, since the internal resistance of the silicon diode is very small as compared with the internal resistance of the germanium diode plus the resistance of the resistor in series with it.

Moreover resistors may be provided according to the invention by the aid of which the characteristics of the diodes and/or transistors can be equalized.

These and other features of my said invention will be clearly understood from the following description of some embodiments thereof given by way of example with reference to the accompanying drawings in which.

Figure 1:
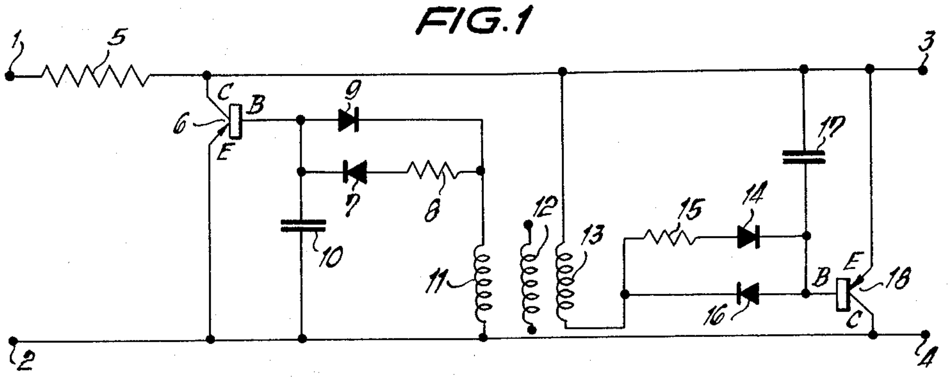
FIG. 1 is a circuit diagram of a control circuit arrangement.

Referring to this drawing, 1, 2 are the input terminals, 3, 4 are the output terminals of a circuit arrangement according to the invention; 5, 8 and 15 are ohmic resistors, 6 and 18 are transistors, 7 and 14 are germanium diodes connected in series with the resistors 8 and 15, respectively; 9 and 16 are silicon diodes connected antiparallel to the germanium diodes 7, 14 and resistors 8, 15, respectively; 12 is the primary, and 11, 13 are two secondaries of a high frequency transformer; 10 and 17 are capacitors.

The control circuit arrangement according to the embodiment illustrated operates as follows:

The voltage to be controlled is applied to the input terminals 1 and 2, and the controlled voltage is derived from the output terminals 3 and 4. The resistor 5 serves as a series resistance of the voltage divider constituted by the said resistor 5 and two transistors 6 and 18. To the primary 12 of the high frequency transformer a high frequency control voltage corresponding to the output voltage on the terminals 3, 4 is applied, which control voltage is derived in the usual manner by modulating a high frequency generator (not shown) by the output voltage. In the secondaries 11 and 13 likewise high frequency voltages are generated which are rectified by the germanium diodes

7 and 14 operating in series with the resistors 8 and 15, and which charge the capacitors 10 and 17 with control direct voltage. With amplitudes below the response voltage of the silicon diodes 9 or 16 the same is yet ineffective so that the capacitors 10 and 17 receive a positive charge on the base sides of the control transistor 6 or 18, respectively, connected in parallel. With increasing control voltages the silicon diode 9 or 16, respectively, begins to become effective, so that then the capacitors 10 and 17 are negatively charged on the base side. Thereby the transistors 6 and 18 become conductive, and an effective division of voltage is attained for the input voltage 1—2.

Figure 2:
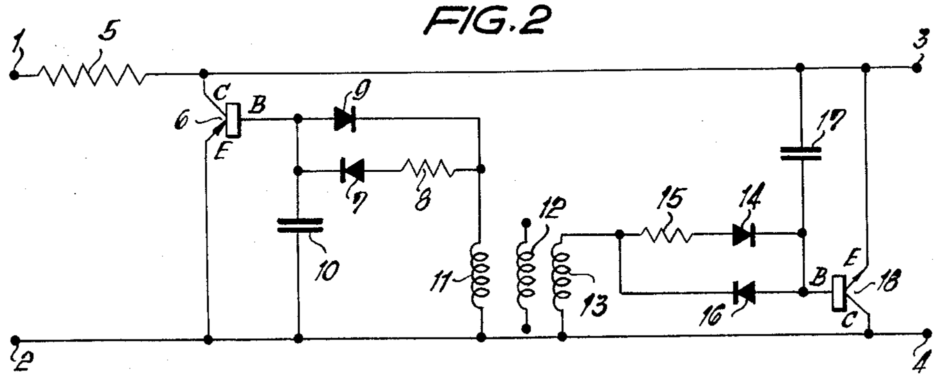
FIG. 2 is a modified circuit diagram.

Referring now to FIG. 2, a circuit diagram incorporating a pnp-transistor circuit 6, 7, 8, 9 and an npn-transistor circuit 14, 15, 16, 17, 18 is illustrated. The secondary coil 13 is here connected to the conductor 4 instead of to conductor 3 as in the diagram of FIG. 1. Otherwise the two circuit arrangements are identical.

Figure 3:
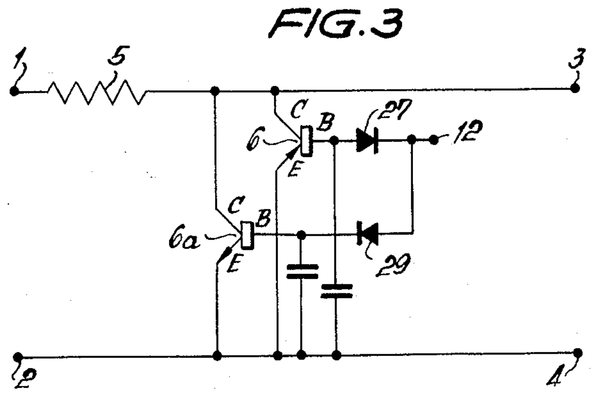
FIG. 3 is another modification thereof according to the present invention.

Referring to FIG. 3, a control voltage generated in any way desired is applied to the terminal 12 and applied through opposite rectifiers 27, 29 to the pnp-transistor 6 and npn-transistor **6*a* respectively, both transistors lying in parallel to one another across the conductors 3, 4**.

Figure 4:
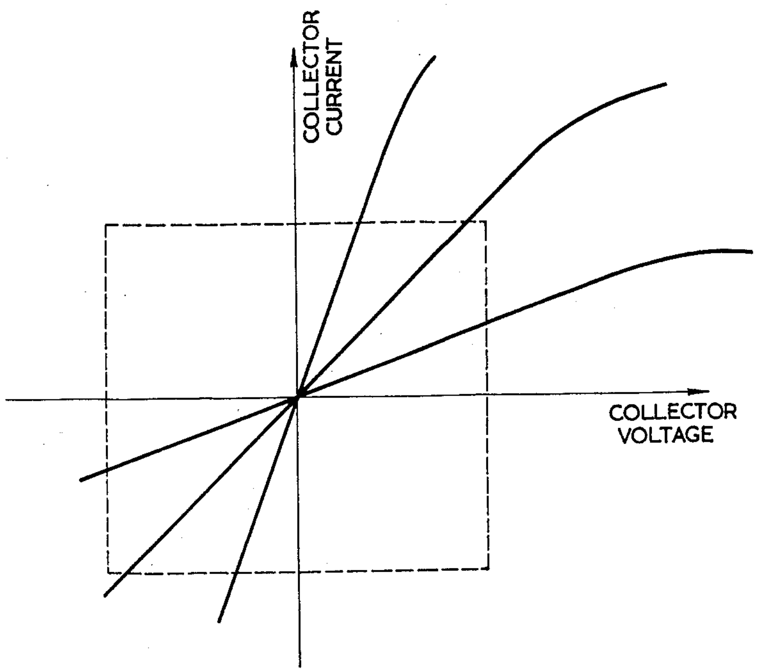
FIG. 4 is a diagram plotting collector current against collector voltage in the immediate vicinity of the origin of this diagram.

FIG. 4 shows four graphs of collector currents plotted against collector voltage, which represent different values of base current. Since these graphs are straight lines over the operating range, viz.: within the square shown in dotted lines, the transistor functions as an ohmic resistor, the ohmic resistance of which is adjustable by varying the base current.

While I have described herein what may be considered typical and particularly useful embodiments of my said invention, I wish it to be understood that I do not limit myself to the particular details described and illustrated, for obvious modifications will occur to a person skilled in the art.

What I claim as my invention and desire to secure by Letters Patent, is:

1. A control circuit arrangement for amplifiers operating on the principle of voltage divider regulation, comprising in combination: a fixed resistor, at least one transistor having a base and having a collector-emitter circuit free from D.C. offset forming a variable resistor connected in series with the said fixed resistor the input alternating voltage to be regulated being applied across the said two resistors connected in series, the regulated output alternating voltage being derived across the said variable resistor and being applied to the said base, the amplitude of the alternating voltage supplied to said collector-emitter circuit being smaller than the emitter-base conduction threshold voltage of said transistor.

2. A control circuit arrangement for amplifiers operating on the principle of voltage divider regulation, comprising in combination: a fixed resistor, two complementary symmetrical transistors each having a base, and having a collector-emitter circuit free from D.C. offset forming a variable resistor, the said two transistors being connected in parallel to one another and having their said collector-emitter circuits in series with the said fixed resistor, the input alternating voltage to be regulated being applied across the said fixed and variable resistors in series, and the regulated output alternating voltage being derived across the said collector-emitter circuits in parallel of one another, and being applied in common to the said bases of the said transistors.

3. A control circuit arrangement for amplifiers operating on the principle of voltage divider regulation, comprising in combination: a fixed resistor, two identical transistors each having a base and having a collector-emitter circuit free from D.C. offset, the said two transistors being connected to one another in anti-parallel connection, the said collector-emitter circuits forming a variable resistor connected in series to the said fixed resistor, the input alternating voltage to be regulated being applied across the said fixed and variable resistors in series, and the regulated output alternating voltage being derived across the said collector-emitter circuits in parallel of one another, and being applied separately at suitable polarity and magnitude to each of the said bases of the two transistors.

4. A control circuit arrangement for amplifiers operating on the principle of voltage divider regulation, comprising in combination: a fixed resistor, at least one transistor having a base and having a collector-emitter circuit free from D.C. offset forming a variable resistor connected in series with the said fixed resistor, the input alternating voltage to be regulated being applied across the said fixed and variable resistors connected in series, and an output circuit branched across the said variable resistor and deriving the regulated output voltage therefrom, transformer means coupled to the said output circuit and generating at least one alternating control voltage proportional to the said output alternating voltage, and rectifier means connected to the said transformer means and transistor, rectifying said control voltage and applying the same to the base of the said transistor.

5. A control circuit arrangement for amplifiers operating on the principle of voltage divider regulation, comprising in combination: a fixed resistor, at least one transistor having a base and having a collector emitter circuit free from D.C. offset forming a variable resistor connected in series with the said fixed resistor, the input alternating voltage to be regulated being applied across the said fixed and variable resistors connected in series, an output circuit branched across the said variable resistor and deriving the regulated output voltage therefrom, transformer means coupled to the said output circuit and generating at least one alternating control voltage proportional to the said output alternating voltage and rectifier means having at least two rectifier diodes of different response voltages and internal resistances arranged in antiparallel connection to one another, the said rectifier means being connected to the said transformer means and to the said transistor, rectifying said control voltage and applying the same to the base of the said transistor.

6. A control circuit arrangement for amplifiers operating on the principle of voltage divider regulation, comprising in combination: a fixed resistor, two transistors each having a base and a collector-emitter circuit free from D.C. offset forming a variable resistor, the said two variable resistors being connected in parallel to each other in series with the said fixed resistor the input alternating voltage to be regulated being applied across the said fixed and variable resistors connected in series, an output circuit branched across the said variable resistors and deriving the regulated output alternating voltage from them, transformer means coupled to the said output circuit and generating at least one alternating control voltage proportional to the said output voltage, rectifier means having at least two rectifier diodes of different response voltages and internal resistances arranged in anti-parallel connection to one another, the said rectifier means being connected to the said transformer means and to the said transistors, rectifying said control voltage and applying the same to the bases of the said transistors, and resistor means connected to the said rectifier means and transistors compensating differences of the characteristics thereof.

References Cited in the file of this patent

UNITED STATES PATENTS

| | | |
|---|---|---|
| 2,753,514 | Muchnick | July 3, 1956 |
| 2,869,069 | Wright | Jan. 13, 1959 |
| 2,906,941 | Brolin | Sept. 29, 1959 |